H. J. DAVIES.

CLOCK-CASE.

No. 6,923. Reissued Feb. 15, 1876.

Witnesses
John Becker
Benj. W. Hoffman

Henry J. Davies
by his Attorneys
Brown & Allen

N. PETERS, PHOTO-LITHOGRAPHER, WASHINGTON, D. C.

UNITED STATES PATENT OFFICE.

HENRY J. DAVIES, OF BROOKLYN, NEW YORK.

IMPROVEMENT IN CLOCK-CASES.

Specification forming part of Letters Patent No. 161,211, dated March 23, 1875; reissue No. 6,923, dated February 15, 1876; application filed January 31, 1876.

DIVISION A.

*To all whom it may concern:*

Be it known that I, HENRY J. DAVIES, of Brooklyn, in the county of Kings and State of New York, have invented a new and useful Improvement in Clocks; and I do hereby declare that the following is a full, clear, and exact description thereof, reference being had to the accompanying drawing forming part of this specification.

My invention consists of an entablature arranged in an elevated position, and constructed to receive and support the clock-works, and also to support a glass shade arranged over and inclosing said clock-movement, as will more fully hereafter appear.

Having given a general description of my invention, I will now proceed to describe it in detail, making reference to the particular example of my invention which is illustrated in the accompanying drawing.

Figure 2:
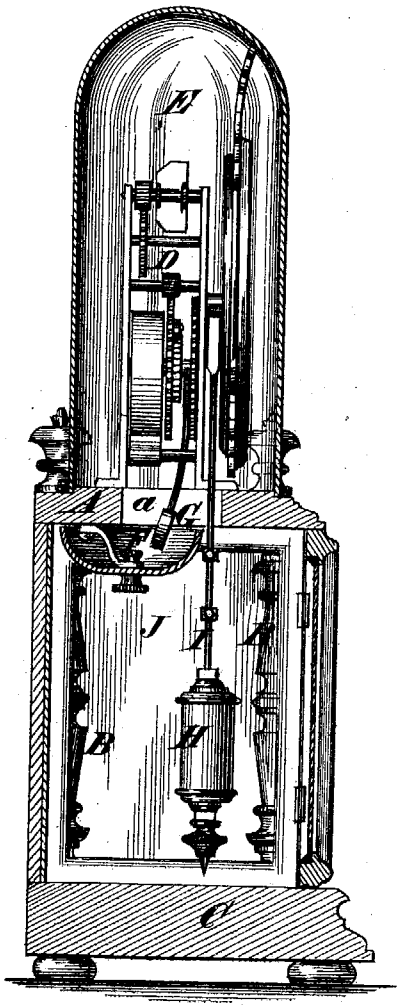
Figure 1:
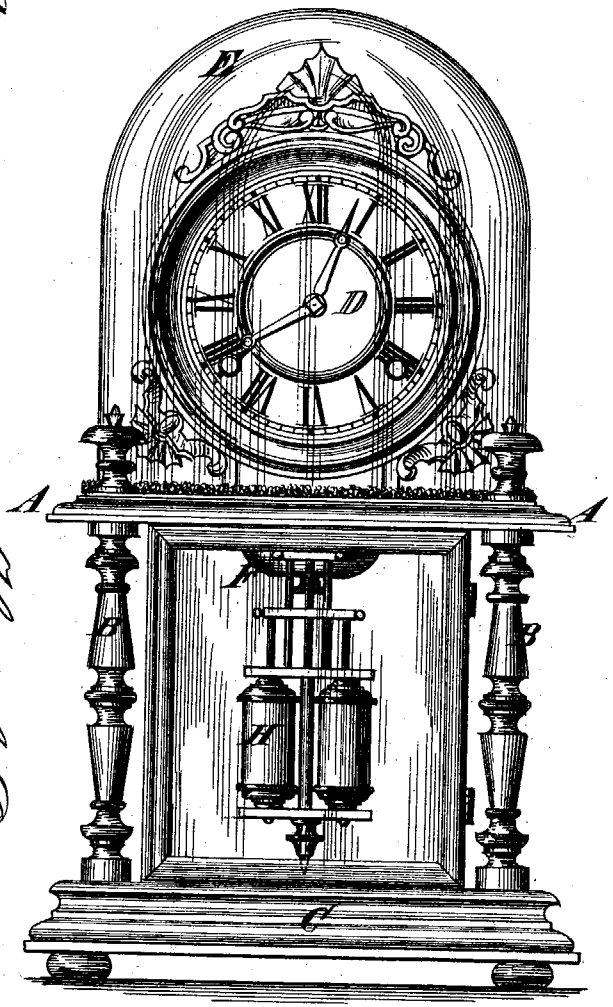

Figure 1 in this drawing is a front view of a clock embodying my invention, and Fig. 2 is a central transverse section through the case of the same.

Similar letters of reference indicate corresponding parts in both figures.

The elevated entablature may be supported in various ways—for instance, by columns or legs, or a suitable case or stand; but, in the example of my invention which is illustrated in the drawing an entablature, A, is supported in an elevated position by ornamental columns B, erected on a surface, plinth, or pedestal, C. A clock-movement of any suitable construction is mounted in this entablature. The movement D, which is shown in the drawings, has an ornamental face or front plate. Above this entablature I arrange a glass shade, so as to inclose the clock-movement. The shade employed for this purpose may be of any suitable form—for instance, dome-shaped, like the shade E represented in the drawing—and it may rest directly on the entablature like the shade E, or it may be elevated on some intermediate contrivance.

When a bell is used, it may be arranged in any suitable manner within reach of the clapper or hammer.

The drawing represents a bell, F, as being arranged on the under side of the entablature A, and a clapper G, as extending through an opening, *a*, in the entablature to operate such bell.

The pendulum H is suspended below the entablature by a rod, I, which passes through the opening *a* in the said entablature, and below the entablature is arranged a case, J, having glazed front and sides, which permit the pendulum to be seen, and a mirror is or may be arranged at the back to reflect the pendulum and enhance the appearance of the clock.

By means of this invention I am enabled to produce clocks of highly ornamental and tasteful appearance at very moderate cost, so that they can be sold for a low price, within the means of even the poorer classes.

What I claim as my invention, and desire to secure by Letters Patent, is—

1. The entablature A, arranged in an elevated position, and constructed to receive and support the clock-work, and the glass shade, arranged over and inclosing the clock-movement, as and for the purpose described.

2. The elevated entablature, constructed to receive and support the clock-movement, and the glass shade inclosing said movement, the pendulum of the clock passing downwardly through said entablature, and vibrating within a case below the entablature, as and for the purpose described.

HENRY J. DAVIES.

Witnesses:
BENJAMIN W. HOFFMAN,
FRED HAYNES.